Figure 1:
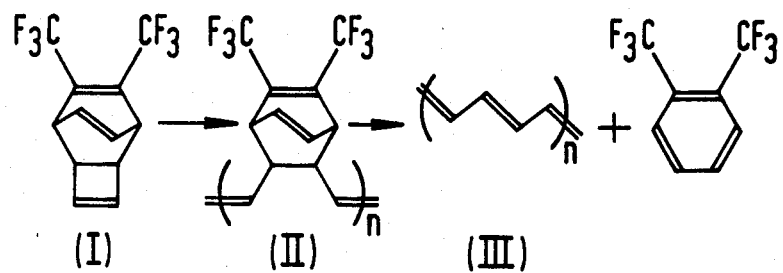

United States Patent [19]

Feast et al.

[11] Patent Number: 4,673,731
[45] Date of Patent: Jun. 16, 1987

[54] NOVEL POLYMERS AND COPOLYMERS AND PRODUCTION OF POLY(ACETYLENE)

[75] Inventors: William J. Feast, Durham; Jeremy N. Winter, South Croydon, both of England

[73] Assignee: The British Petroleum Company, p.l.c., London, England

[21] Appl. No.: 816,713

[22] Filed: Jan. 7, 1986

Related U.S. Application Data

[62] Division of Ser. No. 760,486, Jul. 30, 1985, Pat. No. 4,626,580.

[30] Foreign Application Priority Data

Aug. 4, 1984 [GB] United Kingdom ............... 8419949
Aug. 25, 1984 [GB] United Kingdom ............... 8421643
Sep. 8, 1984 [GB] United Kingdom ............... 8422743

[51] Int. Cl.$^4$ ............... C08F 6/06; C08F 236/16; C08F 232/08
[52] U.S. Cl. ............... 528/503; 526/252; 526/281; 525/210; 525/211

[58] Field of Search ............... 525/210, 211; 526/252, 526/281; 528/503

[56] References Cited
PUBLICATIONS

Polymer, 1980, vol. 21, Jun., Edwards et al., pp. 595–596.
Chem. Abstracts, vol. 90, 122131x, Tsonis et al.
Chem. Abstracts, vol. 95, 62818e, Pukuro, et al.

Primary Examiner—Joseph L. Schofer
Assistant Examiner—Peter F. Kulkosky
Attorney, Agent, or Firm—Brooks Haidt Haffner & Delahunty

[57] ABSTRACT

Novel polymers and copolymers containing the monomer 3,6-bis(trifluoromethyl)pentacyclo [6.2.0.0$^{2,4}$.0$^{3,6}$.0$^{5,7}$] dec-9-ene are prepared which can be easily converted into poly(acetylene). The polymer (copolymer) and subsequent poly(acetylene) can be made into any desired shape, such as into films.

8 Claims, 3 Drawing Figures

NOVEL POLYMERS AND COPOLYMERS AND PRODUCTION OF POLY(ACETYLENE)

This is a division of application Ser. No. 760,486 filed July 30, 1985, now U.S. Pat. No. 4,626,580.

Generally, the present invention relates to novel polymers and copolymers, their production and the production of poly(acetylene). More specifically, the present invention relates to polymers containing 3,6-bis(trifluoromethyl)pentacyclo [$6.2.0.0^{2,4}.0^{3,6}.0^{5,7}$] dec-9-ene and to a copolymer of 7,8-bis(trifluoromethyl)tricyclo [$4.2.2.0^{2,5}$]deca-3,7,9-triene and 3,6-bis-(trifluoromethyl)pentacyclo[$6.2.0.0^{2,4}.0^{3,6}.0^{5,7}$]dec-9-ene and to a method of producing poly(acetylene) therefrom.

Poly(acetylene) is known to have highly desirable electrical conducting properties. Such polymers are usually produced by direct polymerisation of acetylene gas in the presence of a catalyst, e.g. as described by Ito et al. (J. Polymer. Sci. Polymer Chem. Ed.,12, pp 11, 1974). The polymers thus produced have a relatively low density of about 0.4 g/cc and have a morphology which is an open, irregular, fibrillar structure with random orientation of the fibrils. The conductivity of such polymers has hitherto been improved by appropriate chemical doping. The morphology of polymers produced hitherto offers an advantage with respect to the speed of chemical reactions such as doping. However, due to the high surface area which is an inherent characteristic of such a morphology, the poly(acetylene) is also highly susceptible to oxidative degradation. Moreover, the open and irregular morphology of the polymer and the random orientation of the fibrils makes the doping of specific areas of the film with well-defined edges, which is the basis of the semi-conductor industry, virtually impossible. Such polymers are also infusible and insoluble in conventional solvents thereby making it difficult to fabricate isotropic and anisotropic articles therefrom. Thus, there is a continuing need in industry for a poly(acetylene) which can be easily and conveniently fabricated into articles of a desired shape, and which can be fabricated to possess a degree of chain alignment. This chain alignment increases the anisotropy of electrical properties.

Edwards and Feast (Polymer, vol. 21, June 1980, pp 595) have described a method of producing poly(acetylene) (III) by first polymerising the precursor 7,8-bis(trifluoromethyl)tricyclo[$4.2.2.0^{2,5}$]deca-3,7,9-triene (I) using a catalyst in toluene and the precursor polymer (II) so formed is spontaneously decomposed to a black product and 1,2-bis(trifluoromethyl)benzene. When the precursor polymer (II) was heated to 150° under a vacuum of 0.01 mm of mercury for 5 hours the authors obtained a product which had an infra-red and Raman spectrum corresponding to that of trans-poly(acetylene) although the elemental analysis showed that only 96.3% of the fluorine had been removed. When heated for a further 3 hours at 210° C., 98.9% of the fluorine had been removed although the polymer would probably have been degraded by this stage. The authors state that this type of system is too labile for convenient generation of poly(acetylene) and that they were investigating related structures in order to find a more stable precursor.

Our EP No. 0080329-A describes a method of producing coherent polyacetylene films by casting a film of the precursor polymer (II) and thermally decomposing the film so formed between 20° and 200° C. under reduced pressure. FIG. 1 of the attached drawings illustrates the reactions taking place in the formation of poly(acetylene) (III) by this route.

Figure 2:
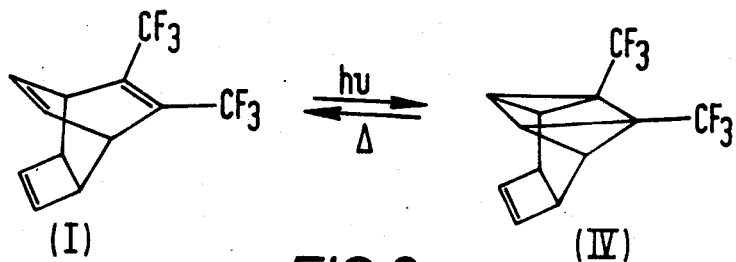

A recent publication by Liu, R. S. in Tetrahedron Letters (1969), 1409 describes a process for photo-isomerising 7,8-bis (trifluoromethyl)tricyclo [$4.2.2.0^{2,5}$]deca-3,7,9-triene (I) using UV radiation to form 3,6-bis(trifluoromethyl) pentacyclo [$6.2.0.0^{2,4}.0^{3,6}.0^{5,7}$]dec-9-ene (IV). However, in this reference the monomer (IV) was not isolated and no polymer was formed. FIG. 2 of the attached drawings illustrates the formation of monomer (IV) from monomer (I).

Figure 3:
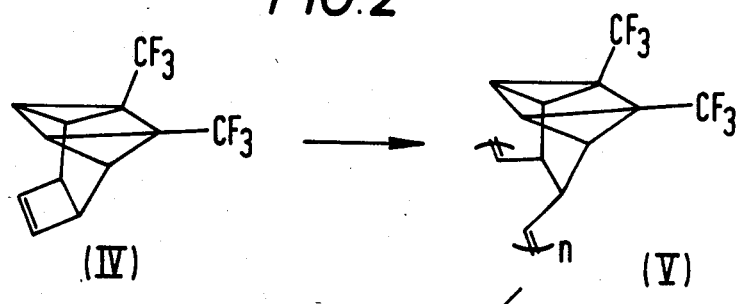

It has now been found that the monomer (IV) may be isolated, purified, characterised and polymerised. Moreover, the polymer so formed has a negigible transformation rate at ambient conditions and may be converted by a series of reactions into poly(acetylene) (III). It is believed that this reaction occurs according to the attached FIG. 3.

It has also been found that stable copolymers containing the monomer (IV) can be prepared which can also be converted by a series of reactions into poly(acetylene) (III). It should be noted that where the concentration of monomer (IV) is high, caution should be used in handling the polymer or copolymer material to avoid explosive transformations.

Moreover, the poly(acetylene) prepared from either the polymer or copolymer generally exhibit an improved morphology as compared to the poly(acetylene) prepared by direct polymerisation techniques.

Thus, it is an object of this invention to provide a convenient and commercially viable process for preparing coherent homogeneous poly(acetylene) (III) from precursor polymers (or copolymers) which are stable with respect to transformation at or about room temperature.

Accordingly, in one embodiment of the present invention, a metathesis polymer is provided comprised of multiple units of 3,6-bis(trifluoromethyl) pentacyclo [$6.2.0.0^{2,4}.0^{3,6}.0^{5,7}$]-dec-9-ene. The polymer can also contain multiple units of 7,8-bis (tri-fluoromethyl) tricyclo [$4.2.2.0^{2,5}$] deca-3,7,9-triene (I) and thus be a copolymer of formula (VI).

Also provided herein is a process for preparing the above polymer or copolymer comprising bringing a solution containing at least 3,6-bis(trifluoromethyl) pentacyclo [$6.2.0.0^{2,4}.0^{3,6}.0^{5,7}$]-dec-9-ene (IV) and optionally 7,8-bis (tri-fluoromethyl) tricyclo [$4.2.2.0^{2,5}$] deca-3,7,9-triene (I) into contact with a metathesis catalyst at a temperature from −50° C. to 70° C. in an atmosphere substantially inert under the reaction conditions employed.

In another embodiment of this invention, a process is provided for producing a coherent poly(acetylene) (III) comprising solvent casting a solution of the polymer comprised of 3,6-bis(trifluoromethyl) pentacyclo [$6.2.0.0^{2,4}.0^{3,6}.0^{5,7}$]-dec-9-ene (IV) and heating at a temperature of between 50° and 120° C. under reduced pressure over a duration of between 0.1 and 100 hours in an inert atmosphere.

Preferably, the solution is cast into a film and transformed into a coherent film of poly(acetylene) (III).

An important aspect of the present invention is that the polymer produced essentially from the monomer 3,6-bis(trifluoromethyl) pentacyclo [$6.2.0.0^{2,4}.0^{3,6}.0^{5,7}$]-dec-9-ene (IV) is substantially stable at ambient temperatures. Thus, it does not undergo any significant degree of decomposition at room temperature e.g. up to about 30° C. For example, for 10% of polymer (V) to be converted to poly(acetylene) it takes about 1.5 years at room temperature. The copolymer is also stable at room temperature. However, the stability is dependent upon the concentration of the monomer (IV) present in the copolymer composition.

The monomer 3,6-bis(trifluoromethyl) pentacyclo [6.2.0.0$^{2,4}$.0$^{3,6}$.0$^{5,7}$]dec-9-ene (IV) is characterised by the following physical and spectral data.

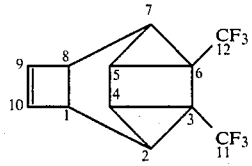

$^1$Hnmr - 300.13 MHz CDCl$_3$/tms
Delta  1.66 (multiplet; 2H)         2,7 and 4,5
       2.05 (doublet [5.5 Hz] × multiplet; 2H)
       3.16 (doublet [4.1 Hz] × multiplet; 2H)   1,8
       6.28 (singlet; 2H)                         9,10

$^{13}$Cnmr - 75.468 MHz CDCl$_3$/tms (proton broad band decoupled)

Delta   13.43 (singlet)     ⎤
        26.55 (singlet)     ⎬  1,8; 2,7; and 4,5
        30.94 (singlet)     ⎦
        125.55 (quartet 271 Hz)   11,12
        141.21 (singlet)           9,10
        tertiary carbon not detected   3,6

$^{19}$Fnmr - CDCl$_3$/tms
Delta  68.0 ppm upfield from CFCl$_3$

It is a white crystalline solid mp 46° C. (from pentane) sublimable at ambient temperature at 10$^{-3}$ mmHg pressure.

The polymer consisting essentially of repeating units of 3,6-bis(trifluoromethyl)pentacyclo [6.2.0.0$^{2,4}$.0$^{3,6}$.0$^{5,7}$]-dec-9-ene (IV) is represented by the general formula (V) where n is a number from 50 to 50,000, preferably 1000 to 30,000. For convenience, the polymer (V) and copolymer (VI) will be examined more closely and be specifically referred to in the preparation. However, as appreciated by one skilled in the art, the polymer (copolymer) of this invention can contain other monomer units in addition to the monomer (IV) (and the monomer (II)) without departing from the spirit and scope of the present invention.

The polymer (V) has the following structure and physical and spectral characteristics:

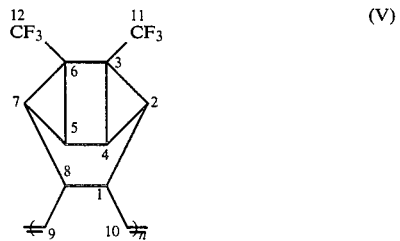

The polymer (V) is white and soluble in certain organic solvents. Solutions of the polymer can be used to cast fibres or films.

The NMR data on the polymer (V) is as follows:

$^{13}$Cnmr 67.78 MHz (CD$_3$)CO/tms (proton broad bond decoupled)
Delta  13.6 (broad singlet)

21.2 (broad singlet)   ⎤
       26.6 (broad singlet)   ⎬  2,7; 4,5; and 1,8
       126.0 (quartet, 271 Hz) ⎦  11,12
       132.0 (broad singlet)     9,10
       tertiary carbon not detected $^{19}$Fnmr - CDCl$_3$/tms
Delta  68.0 ppm upfield from CFCl$_3$ The polymer (V) is prepared by contacting a solution of 3,6-bis(trifluoromethyl)pentacyclo [6.2.0.0$^{2,4}$.0$^{3,6}$.0$^{5,7}$] dec-9-ene (IV) with a metathesis catalyst at a temperature suitably from −50° C. to 70° C., preferably from −30° C. to 20° C. in an atmosphere substantially inert under the reaction conditions.

The monomer (IV) can be dissolved in a wide range of organic solvent which will evaporate under the conditions employed. Examples of suitable solvents include ethers, esters, ketones, and aromatics hydrocarbons. Preferred solvents are acetone, methylethyl ketone, ethyl acetate and chlorobenzene. Generally the monomer (IV) is dissolved to a concentration from 100 to 1000 g/l.

The copolymer (VI) of the present invention is a metathesis copolymer of 3,6-bis(trifluoromethyl)pentacyclo [6.2.0.0$^{2,4}$.0$^{3,6}$.0$^{5,7}$] dec-9-ene (IV) and 7,8-bis(trifluoro methyl)tricyclo [4.2.2.0$^{2,5}$] dec-3,7,9-triene (I). The copolymer can be subjected to elevated temperatures and reduced pressures to produce poly(acetylene) (III).

The copolymer of the present invention can be represented by the following general formula:

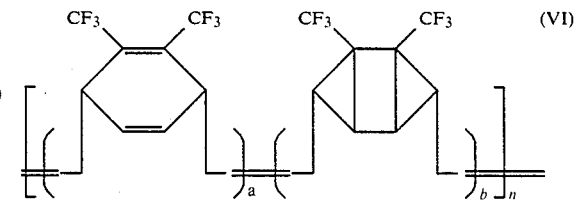

wherein a and b represent the number of repeating monomer units in n with the proviso that a and b are each less than about 100 and such that a/b is between 0.01 and 100 and n is a number from 50 to 50,000, preferably from 1000 to 30,000.

The copolymer can be prepared containing varying compositions e.g. varying ratios of the monomers which will effect its temperature of conversion and other physical characteristics. For example, each copolymer will have specific physical characteristics depending on the ratio of the monomer (IV) to the monomer of formula (I). Thus, the copolymers herein can be tailored during preparation to provide the characteristics desired (e.g. stability) for the conversion to the final poly(acetylene) (III) product.

When preparing the copolymer (VI) organic solutions of 7,8-bis(trifluoromethyl)tricyclo [4.2.2.0$^{2,5}$] deca-3,7,9-triene (I) and 3,6-bis(trifluoromethyl)pentacyclo [6.2.0.0$^{2,4}$.0$^{3,6}$.0$^{5,7}$]dec-9-ene (IV) are mixed to the desired ratio followed by polymerisation in the presence of a metathesis catalyst. Alternatively, a solution of 7,8-bis(trifluoromethyl)tricyclo [4.2.2.0$^{2,5}$] deca-3,7,9-triene (I) can be photoisomerised for a sufficient period to convert the monomer (I) to the desired amount of its isomer 3,6-bis(trifluoromethyl)pentacyclo [6.2.0.0$^{2,4}$.0$^{3,6}$.0$^{5,7}$] dec-9-ene (IV). The mixture of (I) and (IV) would then be polymerised at temperatures from about $-50°$ C. to about 70° C., preferably 0° to 10° C., in an atmosphere substantially inert under the reaction conditions such as nitrogen.

The ratio of monomer (I) to monomer (IV) can vary widely. Preferably, the ratio of monomer (I) to monomer (IV) will be between about 0.1 and about 100.0, most preferably between 0.1 and 10. The total concentration of monomer in the solution can vary from 100 to 1000 g/l.

The metathesis polymerisation catalyst may be any one of those known to those skilled in the art provided that such catalyst does not adversely affect the structure of the monomers except to open the cyclobutene ring so as to enable polymerisation to occur. Examples of such metathesis polymerisation catalysts are a molybdenum pentachloride-tetraalkyl tin system and a tungsten hexachloride- tetraalkyl tin system. In a typical process, for the production of the polymer (V), the molybdenum catalyst gave a polymer having a weight average molecular weight of 100,000 whereas the tungsten catalyst gave a polymer of weight average molecular weight 550,000.

Metathesis polymerisations are well known to those skilled in the art. Typically, tetramethyltin may be dissolved in a solution of molybdenum pentachloride in chlorobenzene or other suitable solvent under a blanket of inert gas and the resultant catalyst solution may be introduced into a solution of the monomers employed which may also be in chlorobenzene. The reaction is conducted at about 0° C. under an inert atmosphere such as nitrogen for a few hours until the reaction mixture becomes viscous. The polymerisation may thereafter be terminated by the addition of a chain stopping agent such as methanol. The polymer (V) or copolymer (VI) so formed may then be separated from the monomers and then, if necessary, reprecipitated by dissolving in a suitable organic solvent such as acetone followed by addition to methanol. The precipitated polymer may then be dried under reduced pressure.

The polymer (V) or copolymer (VI) so produced may then be converted to poly(acetylene) (III) by a decomposition route similar to that described in our prior published EP No. 802329-A. However, polymer (V) and copolymer (VI) exhibit a significant reduction in the rate of conversion at room temperature when compared with the polymer (II). Further, the rate of conversion is significantly faster at elevated temperatures.

The polymer (V) or copolymer (VI) may be shaped into any desired shape prior to conversion to poly(acetylene) (III). For instance it may be shaped into fibres, rods, plates or films and then converted so as to generate a poly(acetylene) (III) product having the same shape as that of the original polymer (V) or copolymer (VI). Conventional techniques known to those skilled in the art can be employed for formed the desired shapes from the solution of polymer (V) or copolymer (VI).

Poly(acetylene) (III) can be prepared by solvent casting a solution of a polymer of the general formula (V) or copolymer of the general formula (VI) and transforming the pre-cast polymer (V) or copolymer (VI) into the poly(acetylene) (III) and by-product 1,2-bis(trifluoromethyl)benzene at a temperature between about 50° and about 120° C., preferably between 70° to 100° C., under reduced pressure over a duration of between 0.1 and 100 hours in an atmosphere inert to the precursor polymer (V) or copolymer (VI) and to the poly(acetylene) (III).

In a preferred embodiment, polymer (V) or copolymer (VI) may be cast into a thin film from a solution thereof and the film, when subjected to elevated temperature and reduced pressure, results in a poly(acetylene) film.

For solvent casting, the polymer (V) or copolymer (VI) is preferably dissolved in an organic solvent to a concentration which, for a given depth of solution, gives the desired thickness of the required shape. This concentration is typically up to about 100 g/l. The polymer (V) or copolymer (VI) is suitably cast from organic solvents such as acetone, chloroform, ethyl acetate, ethyl methyl ketone and the like.

During the solvent casting process it is most desirable to minimise moisture and/or oxygen content of the system in order to produce a coherent film or other shape having the desirable properties of conductance. It is most preferable to carry out the casting in an atmosphere inert with respect to the polymer (V) or copolymer (VI) and the eventual polyacetylene (III) formed. The inert atmosphere is suitably provided by nitrogen or argon gas. The casting temperature may be adjusted as necessary to control the rate of deposition of the polymer (V) or copolymer (VI) from the solvent.

After casting, the temperature at which and the duration for which the polymer (V) or copolymer (VI) is heated to produce the poly(acetylene) will depend upon the rate of transformation desired and, in the case of copolymer (VI), on the concentration of the monomer (IV) in the copolymer. For instance, the polymer (V) or copolymer (VI) is heated at a temperature from 50° to 120° C., preferably between 70° and 100° C., under vacuum or in the presence of an inert atmosphere, e.g. nitrogen, to transform the polymer (V) or copolymer (VI) into coherent poly(acetylene) (III). The heating procedure may be carried out for a period between 0.1 and 100 hours to form the poly(acetylene) (III). Although the rate of heating may vary, the rate of heating is suitably between 1° and 10° C. per minute with the lower the temperature, the longer the duration of heating. For some uses partial transformation may be adequate and hence variations outside the preferred ranges may be acceptable.

The poly(acetylene) (III) formed from either the polymer (V) or copolymer (VI) has a substantially higher density than the poly(acetylene) polymers produced by direct polymerisation of acetylene. For instance, the density of the poly(acetylene) (III) produced according to the present invention is approximately 1.1 g/cc whereas that of the poly(acetylene) produced by direct polymerisation of acetylene according to the prior art methods is only about 0.4 to 0.5 g/cc. The calculated crystalline density of poly(acetylene) is 1.2 g/cc. The morphology of the poly(acetylene) (III) produced according to the present invention from the polymer (V) or copolymer (VI) is a thin, coherent solid film with no significant quantity of voids.

The conductivity of the pristine poly(acetylene) (II) produced according to the present invention from either the polymer (V) or copolymer (VI) is generally in the range of between about $10^{-8}$ and about $10^{-7}$ per ohm per cm.

The electrical properties of the poly(acetylene) produced according to the present invention may be altered as desired by addition of suitable dopants known in the art. Examples of dopants include the halogens, fluorides of arsenic, protonic acids and alkali metals in appropriate forms. The dopants are suitably added by diffusion from a gas or liquid phase, electrochemical diffusion or by ion implantation techniques. The morphology of the poly(acetylene) produced herein is particularly suitable for selective area doping, with a resolution which is better than 1000 Å. In comparison the fibrils in directly polymerised poly(acetylene) give a resolution figure which rises to around 100 microns which is approximately 1000 times larger.

Upon doping, the conductivity of these films can be substantially improved. For instance, by using iodine as dopant the conductivity of the coherent film may be improved to a value of greater than 1 per ohm per cm.

The present invention is further illustrated with reference to the following Examples. However, these Examples are only provided to illustrate the present invention and should not be construed as limiting the scope of this invention which includes equivalent embodiments, modifications and variations.

1. Preparation of 3,6-bis(trifluoromethyl)pentacyclo[6.2.0.0$^{2,4}$.0$^{3,6}$.0$^{5,7}$]-dec-9-ene (IV)

A solution of 7,8-bis(trifluoromethyl)tricyclo[4.2.2.0$^{2,5}$] dec-3,7,9-triene (I) ($\lambda$ max 220 nm; 11 g) in pentane (50 ml) was degassed and placed in a quartz tube fitted with a water-cooled insert. The tube was placed in a 'Rayonnet' photoreactor (120 W radiative power at 254 nm) and irradiated for 5 days. The tube was cooled externally by fan. A light brown flaky deposit, which had formed on the sides of the tube, was filtered off and the pentane removed in vacuo. The product was found (by $^1$H nmr) to be a clean mixture of 85% (IV) and 15% of the starting material. The product was redissolved in a small quantity of pentane; the light yellow crystals which precipitated from this solution upon standing at 248K were trap-to-trap sublimed (293K to 77K) to give pure (by $^1$H nmr) white crystals of (IV) (4 g, 36%) mp 46° C.

2. Polymerisation of (IV)

Tetramethyltin (15 micro 1, 0.11 mmol) was added under $N_2$ to 1.5 ml of a 0.01 g/ml solution of $MoCl_5$ in chlorobenzene (0.05 mmol). The mixture was left to stand for 15 mins and then syringed under $N_2$, into a stirred solution of (IV) (1.45 g, 5.4 mmol) in chlorobenzene (6 ml) cooled to just above 0° C. The contents of the flask gradually became viscous over a period of 2 hours 20 minutes at which time the polymerisation was terminated by addition of MeOH (20 ml). The white polymeric product which precipitated was filtered, redissolved in acetone (20 ml) reprecipitated into $CH_3OH$ (250 ml) and dried (12 hours $10^{-3}$ mm Hg) in vacuo at room temperature to yield 0.5 g (33%) of (V), the polymer from (IV). The molecular weight of the polymer (V) was measured by gel permeation chromatography. The weight average molecular weight was estimated to be from 950,000 to 1,200,000. The average number of repeating units n in polymer (V) was estimated to be about 4000.

3. An Alternate Polymerisation of (IV)

Tetramethyltin (30 micro 1, 0.22 mmoles) was added to a solution of tungsten hexachloride (0.11 mmoles) in chlorobenzene. The mixture was stirred for 25 mins and then syringed under nitrogen into a stirred solution of monomer (IV) (11 mmoles) in chlorobenzene (9 mls) and held at 10° C. The polymerisation was initiated rapidly and polymer began to precipitate from solution after 45 mins. At this point more chlorobenzene (3 mols) was added and the polymerisation continued for another 15 mins. The polymer was totally precipitated by the addition of methanol (30 ml), filtered, washed again with methanol and reprecipitated from acetone solution into methanol to give 2.75 g (90%) of a white product after drying in vacuo. The product remained unchanged. After standing at room temperature for 24 hours. A film of this material, cast from acetone solution, was smoothly converted to polyacetylene at 70° C. and $10^{-3}$ mm Hg.

4. Conversion of (V) to polyacetylene

A thin film of (V) was cast from acetone solution into a film. The film so formed was converted smoothly to a shiny black film, polyacetylene (III), over a period of 3 hours at 75° C. under dynamic vacuum ($10^{-3}$ mm Hg). A film of (V) maintained at ambient temperature, had yellowed slightly over a period of two weeks. Material kept in a refrigerator had shown absolutely no visible sign of deterioration after a similar period. The conversion of polymer (V) to polyacetylene (III) was also followed by differential scanning calorimetry (DSC). 2 mg of (V) were placed in an aluminium pan of a Perking Elmer DSC2 and the sample was heated at 10° C. per minute. A single exotherm was recorded with a peak at about 100° C. Isothermal rates of reaction were calculated from this data; at room temperature, 10% of the reaction would be complete after about 1.5 years and at 100° C., 95% of the reaction would be complete after about ¼ of an hour.

5. The Preparation of a Copolymer (VI) of 7,8-bis(trifluoromethyl)tricyclo[4,2,2,0$^{2,5}$] deca-3,7,9-triene (I) and 3,6-bis(trifluoromethyl)pentacyclo [6.2.0.0$^{2,4}$.0$^{3,6}$.0$^{5,7}$] dec-9-ene (IV)

A solution of monomer (I) (7.95 g) in pentane (25 ml) was placed in a silica tube fitted with a water cooled insert, freeze-thaw degassed and then sealed under nitrogen. The tube was irradiated in a 'Rayonnet' photoreactor, as described above, for 60 hours. The pentane was removed under vacuum (15 mm Hg) and the remaining volatile components of the residue were distilled off at room temperature and a vacuum of $10^{-3}$ mm Hg into a cold traps to give 5.2 g (65%) of a mixture which was shown, by $^1$H and $^{19}$Fnmr, to consist of monomer (I) (15%) and monomer (IV) (85%).

A solution of this mixture (19.5 mmoles) was mixed with chlorobenzene (5 ml), under a nitrogen atmosphere and cooled to $-5°$ C. Tetramethyltin (0.38 mmoles) was added to a solution of tungsten hexachloride (0.24 mmoles) in chlorobenzene (7.8 ml) and left to stand for 15 mins. This activated catalyst mixture was added to the mixture of monomer (I) and monomer (IV) and stirred. The polymerisation was initiated immediately. After 90 mins, methanol (20 ml) was added to precipitate the copolymer product which was filtered off, washed and dried to give 2 g (about a 40% yield) of a white material. Although the white copolymer was easily converted to polyacetylene upon heating, it had not decomposed upon standing at room temperature for 24 hours.

We claim:

1. A process for the producing poly(acetylene) comprising solvent casting a solution of a polymer essentially consisting of 3,6-bis(trifluoromethyl)pentacyclo [6.2.0.0$^{2,4}$.0.$^{3,6}$.0$^{5,7}$]dec-9-ene (IV), and heating at a temperature of between 50° and 120° C. under reduced pressure over a duration of between 1 and 100 hours in an inert atmosphere.

2. The process of claim 1 wherein said solution comprises said polymer (V) dissolved in an organic solvent.

3. The process of claim 2 wherein the concentration of said polymer (V) is up to 100 grams per liter of solvent.

4. The process of claim 2 wherein said poly(acetylene) is a film cast from a film of said polymer (V).

5. A process for producing poly(acetylene) comprising solvent casting a solution of a copolymer essentially consisting of the monomer 3,6-bis(trifluoromethyl) pentacyclo [6.2.0.0$^{2,4}$.0$^{3,6}$.0$^{5,7}$] dec-9-ene (IV), and the monomer 7,8-bis(trifluoromethyl) tricyclo[4.2.2.0$^{2,5}$]deca-3,7,9-triene (I), and heating at a temperature of between 50° and 120° C. under reduced pressure over a duration of between 1 and 100 hours in an inert atmosphere.

6. The process of claim 5 wherein the ratio of said monomer (I) to said monomer (IV) in said copolymer is between 0.1 and 100.

7. The process of claim 6 wherein the concentration of said copolymer is up to 100 grams per liter of solution.

8. The process of claim 7 wherein said poly(acetylene) is a film cast from a film of said copolymer.

* * * * *

UNITED STATES PATENT AND TRADEMARK OFFICE
CERTIFICATE OF CORRECTION

PATENT NO. : 4,673,731

DATED : June 16, 1987

INVENTOR(S) : William James Feast et al

It is certified that error appears in the above-identified patent and that said Letters Patent is hereby corrected as shown below:

In Specification Col. 4, lines 36-44, the structural formula should be drawn as follows:

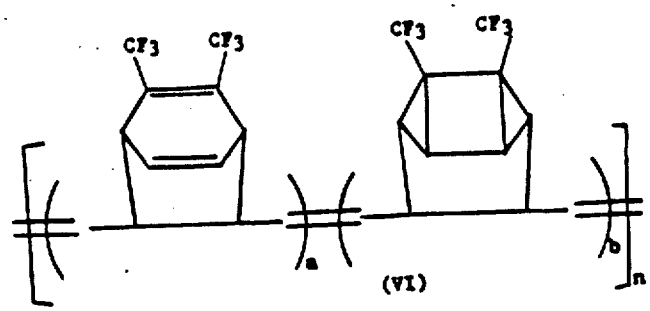

Signed and Sealed this

Twenty-seventh Day of October, 1987

Attest:

DONALD J. QUIGG

Attesting Officer

Commissioner of Patents and Trademarks